Figure 1:
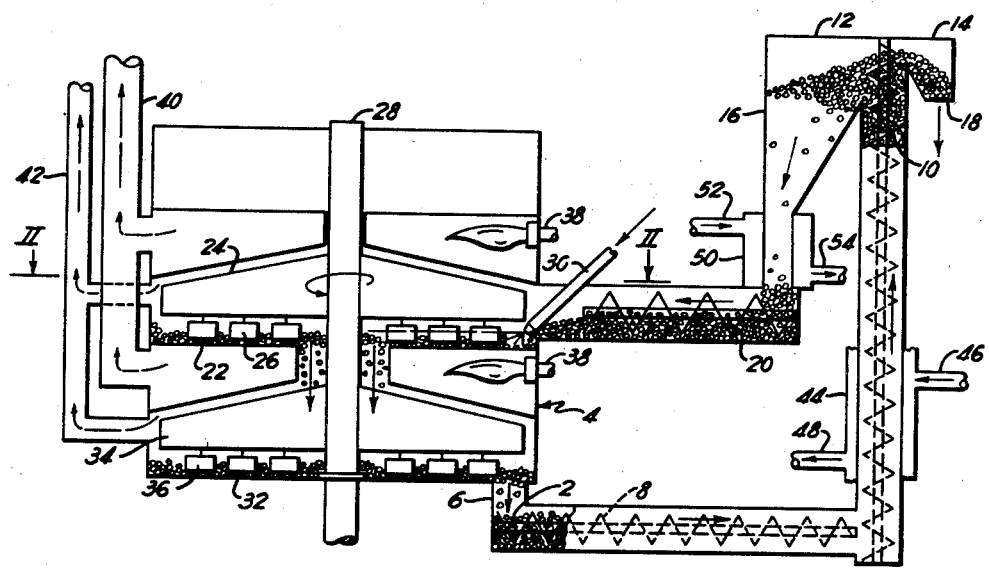

Oct. 23, 1962     W. H. LITCHFIELD     3,060,005
APPARATUS FOR RECOVERING PRODUCTS FROM
SULFURIC ACID SLUDGE
Filed June 18, 1958

INVENTOR.
WILLIAM H. LITCHFIELD
BY
ATTORNEY

United States Patent Office 3,060,005
Patented Oct. 23, 1962

3,060,005
APPARATUS FOR RECOVERING PRODUCTS
FROM SULFURIC ACID SLUDGE
William H. Litchfield, Port Arthur, Tex., assignor to Gulf Oil Corporation, Pittsburgh, Pa., a corporation of Pennsylvania
Filed June 18, 1958, Ser. No. 742,946
2 Claims. (Cl. 23—277)

This invention relates to an improved apparatus for recovering valuable products from sulfuric acid sludges, more particularly apparatus for recovering valuable products such as sulfur dioxide and a carbonaceous material commonly referred to as "coke" from sulfuric acid sludges resulting from the refining of petroleum products.

Sulfuric acid is employed widely and in large amounts in the conventional refining of petroleum hydrocarbons. As a result of such treatment acid sludges consisting essentially of sulfuric acid, sulfonates and hydrocarbon material are formed. Examples of sulfuric acid sludges produced in the petroleum industry as a result of refining petroleum are spent alkylation acids, sludge from pressure still distillate treatment, sludge from lube oil treatment, sludge from wax treatment, sludge from treatment of kerosene, etc. Since the amount of sulfuric acid sludge produced in the petroleum industry is large, and a major portion thereof consists of sulfuric acid, it is apparent that the recovery of sulfuric acid values therefrom is of great importance.

In the past, sulfuric acid values from sulfuric acid sludge have been recovered by heating the sludge to a temperature in excess of about 500° F. for a time sufficient to decompose the same into gaseous products comprising sulfur dioxide, water and hydrocarbon vapors and a carbonaceous material commonly known as "coke." The heat required to maintain decomposition temperatures has been obtained in many ways. In the present case, for example, heat is obtained in two ways. First, heat is supplied for decomposition of the sulfuric acid sludge by burners maintained in indirect heat exchange relationship with the sludge within the decomposition zone. Second, a large amount of the coke which is formed in the decomposition zone is withdrawn therefrom at an elevated temperature, which can be about 400° to about 500° F., and recycled to the decomposition zone to supply additional heat.

The hot coke which is recycled is not reintroduced into the decomposition zone as such, but was previously passed therein along with the sulfuric acid sludge to be decomposed. The sulfuric acid sludge is generally in the form of a liquid, while the coke is a particulate carbonaceous material. Unfortunately when the hot coke and sludge are thoroughly mixed before entering the decomposition zone, for example, in a conveyor with forward and reversing paddles (but in some cases a screw conveyor) large balls of gummy material are formed and/or a heavy deposit is built up on the paddles or screw, plugging the conveyor. Other methods of combining the sludge and coke result in formation of lumps in the decomposition zone or kiln, where they must be broken up to keep the decomposition zone from being clogged. This requires the use of additional equipment in the decomposition zone and further complicates the decomposition process. In addition, since the recycled coke is hot, a small amount of decomposition of the sludge occurs in the feed screw conveyor when contact is made between the coke and sludge. The gas resulting from the decomposition, comprising sulfur dioxide, hydrocarbon vapors, water vapor, etc., is wet and wets the surfaces of the screw conveyor as well as the walls of the chamber in which it is located. Further wetting of the surface of the conveyor and the walls of the chamber can occur from splashing of the sludge when introduced into the chamber. The recycled coke is in particulate form and will deposit on the wet surfaces and walls. In a short time these deposits will build up and clog the screw conveyor.

While some advantage has been obtained in this respect by following the procedure set forth in application Serial No. 581,623 of Arthur E. Catanach now Patent No. 2,894,819, periodic formation of gummy balls and/or heavy deposits are still built up after a time on the paddles or screw of the feed conveyor. Although such procedure involves far less shut-downs than formerly, any shut-down is costly and can be destructive to machinery.

I have found that the above-noted difficulties in the conveyor can be eliminated and the formation of gummy balls in the decomposition zone or kiln can be substantially avoided, while recovering acid values from sulfuric acid sludge, with apparatus which involves introducing hot coked material into said decomposition zone, separately introducing sulfuric acid sludge into said decomposition zone and spraying the same on the hot coked material to form a coating on said hot coked material, maintaining the temperature in said decomposition zone sufficiently high to substantially coke the major portion of the hydrocarbon material in said sludge and obtain gaseous decomposition products, removing said gaseous decomposition products from said decomposition zone, removing coked material from said decomposition zone, and recycling a portion of said latter coked material to constitute the hot coked material coated with the sulfuric acid sludge.

Any sulfuric acid sludge can be employed with the apparatus of the present invention with good results providing the carbon content of the sludge is high enough to maintain sufficient coke for recycle. Spent alkylation acid of about five per cent total carbon content cannot be charged by itself for this reason but must be mixed with a higher carbon content acid sludge. As examples of sulfuric acid sludges which can be employed can be mentioned spent alkylation acids, sludge from pressure still distillate treatment, sludge from lube oil treatment, sludge from wax treatment, sludge from treatment of kerosene, etc., or mixtures thereof. The temperature of the sulfuric acid sludge is not critical, though it should be high enough to permit it to be pumped but not so high as to obtain any appreciable decomposition thereof. In general, the sludge to be treated should be at a temperature of about 60° to about 130° F. While, as noted, any conventional sulfuric acid sludge can be treated with the apparatus of this invention, best results are obtained when the sludge comprises about 35 to about 85 percent by weight of sulfuric acid, a carbon content of about 10 to about 50 percent by weight, and about 0 to about 15 percent by weight of water.

The average particle size of the recycled coke is generally below about 3/8 inch in diameter, preferably between about 1/16 and 1/4 inch in diameter. The temperature of the coke leaving the decomposition zone can be about 400° to about 500° F., but is preferably about 420° to about 460° F. If the temperature of the recycled coke were permitted to drop below about 400° F., the coke would contain some free acid and some undecomposed sludge. The amount of coke which must be recycled to obtain good results is about 15 to 30, preferably about 20 to 25, parts by weight of coke per part by weight of sludge. Within these ranges, the amount of sludge is sufficient to coat or substantially coat a large proportion of the coke particles.

The temperature in the decomposition zone can be as low as about 500° F. or as high as about 1200° F., but preferably is about 700° to about 800° F. The pressure is not critical and can vary from about atmospheric to about four inches water vacuum, a pressure of about one-half inch of water vacuum having been found very satisfactory. Residence time of the sludge in the decomposition zone will depend upon many variable, of course, such as the quality of the sludge being treated, the temperature in the decomposition zone, etc., but in general a period of about two to about 10 minutes has been found to be sufficient.

In order to obtain the beneficial results of the present invention, the manner in which the hot coked material which is introduced into the decomposition zone is coated with the sulfuric acid sludge is extremely critical. In order to effect the desired coating of the hot coked material with sulfuric acid sludge, the two are introduced separately into the decomposition zone. The hot coked material after its introduction into the decomposition zone is spread onto the floor of the hearth to form a thin layer of the same. To facilitate the coating operation, the layer of hot coked material must possess an average thickness of about one to about nine inches preferably about two to about six inches. The sulfuric acid sludge is introduced into the decomposition zone in the form of a finely-divided spray, such as can be obtained by use of a spray nozzle. The nozzle employed should be selected, preferably, to give maximum atomization of the sulfuric acid charged. Most important, in order to obtain maximum coverage of the coke surface and not impinge upon the walls of the decomposer or the rabble arms of the spreader therein and form gummy balls of coked material, it is critical in the practice of this invention to introduce the sulfuric acid sludge in the decomposition zone in a spray pattern having about a 88° to about 92°, preferably about a 90° cone. One edge of said cone is substantially perpendicular to the layer of coke. By operating in accordance with the above no appreciable deposits of sulfuric acid sludge will form in the decomposition zone, which would be likely to form gummy material, and about 70 to about 100 percent by weight of the hot coked material will be substantially completely coated with the sulfuric acid sludge.

Figure 2:
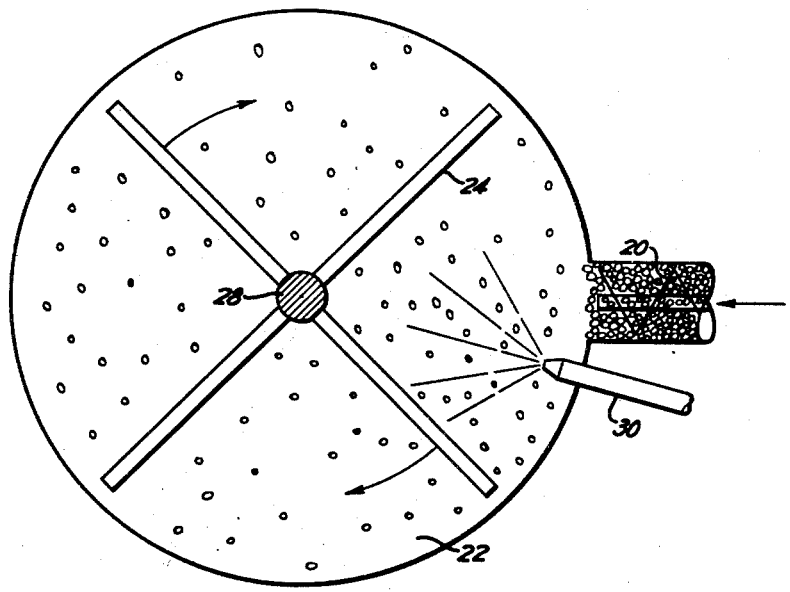

The invention can be illustrated by reference to the accompanying drawing which is hereby incorporated in and made part of the present specification. In FIGURE 1, there is illustrated a somewhat diagrammatic view in elevation of a decomposer, partially in section, which can be employed in the invention. FIGURE 2 is also a somewhat diagrammatic view taken along the line II—II in FIGURE 1.

Finished coke 2 leaves decomposer 4, substantially circular in cross-section, by way of conduit 6 and is moved in any convenient manner, as by screw conveyors 8 and 10, into a hopper 12 having two sections 14 and 16. That portion falling into section 14 constitutes the net make of coke and is withdrawn from the system through outlet 18, while that portion falling into section 16 is picked up by the screw conveyor, or other similar conveying means, 20 and returned to decomposer 4.

The coke particles which are recycled to the decomposer 4 fall onto the upper floor 22 thereof. Rabble arms 24, preferably provided with teeth 26, which are fixedly mounted on rotating shaft 28 rotating in the direction of the arrow encircling it, spread the coke particles across the upper floor 22 of the hearth to form a thin layer thereof while simultaneously moving the coke particles toward the center of the upper floor. As stated, in order to facilitate the coating of the individual coke particles with sulfuric acid sludge, the layer of the coke is maintained at an average thickness of about one to about nine inches, preferably about six inches.

While it is critical in the practice of my invention to spread the coke on upper floor 22 in the manner set forth above, it is equally critical that the sulfuric acid sludge be introduced onto the layer of coke in the form of a finely-divided spray. This can be effected by using a spray nozzle 30. The spray pattern employed is equally critical, because it is absolutely necessary that there be little or no sulfuric acid sludge collecting on rabble arms 24, teeth 26 or the walls of the decomposer 4 if the formation of gummy and carbonaceous balls is to be avoided. To this end the spray pattern of sulfuric acid sludge entering the decomposer 4 is preferably one having about a 90° cone, although in some cases the cone can be as low as about 88° or as high as 92°.

As the coke is coated with sulfuric acid sludge and moves toward shaft 28, it drops on the lower floor 32 wherein rabble arms 34, preferably provided with teeth 36, also fixedly attached to shaft 28, move the coated particles outwardly toward conduit 6 for removal from the decomposer. While the thickness of the layer of coke on lower floor 32 is not as critical as the thickness of the layer on the upper floor, it is generally maintained at about the same thickness, preferably to facilitate heat transfer to each of the particles forming the layer. By the time the coated particles have moved toward the perimeter of lower floor 32 and are ready to drop into conduit 6, the sludge introduced into the decomposer has decomposed to form additional carbonaceous material and gaseous products such as sulfur dioxide, hydrocarbon vapors, carbon dioxide and nitrogen. Heat for the decomposition is supplied to the decomposer 4 by the hot recycled coke and by burners 38, employing natural gas or the like, mounted in indirect heat exchange relationship with respect to the sludge within the decomposition zone itself. Exhaust gases from the burners are removed by line 40, while the decomposition gases are removed by line 42 for further processing.

The amount of sludge that can be charged to the decomposer is limited by the amount of heat that can be transferred into the decomposition zone. In order to get more heat into the decomposition zone, I can add heat to the recycle coke prior to its entry into the decomposition zone in any convenient manner. Thus a jacket 44 can be provided around screw conveyor 10 with hot gases entering line 46 from line 40 and leaving by line 48. In addition or in place of jacket 44, a similar means 50 can be provided in the line below hopper 12, with hot gases entering line 52 from line 40 and leaving by line 54.

The invention can further be illustrated by the following example. Over a twenty-four hour period, 18,000 pounds of coke (net make) having an average diameter of about ¼ inch to ¹⁄₄₀ inch and a temperature of 490° F. were removed from the decomposition zone. The coke was recycled at the rate of 23 cubic feet per minute (about 911 tons per day) and introduced into the decomposition zone wherein rabble arms spread the coke on the upper floor of the hearth to form a layer thereof having an average thickness of 2 inches. The sulfuric acid sludge, at a rate of 55 pounds per minute, was introduced into the decomposition zone in the manner illustrated in FIGURE 1 in the form of a finely-divided spray with a spray pattern having a 90° cone. The sulfuric acid sludge analyzed as follows: 45.2 percent by weight of sulfuric acid, 6.5 percent by weight of water and 38.2 percent by weight of carbon. The temperature in the decomposition zone was maintained at 750° F., the pressure 0 inch of water and the residence time 8 minutes. The decomposition gases analyzed as follows: 76.3 percent by volume sulfur dioxide, 12.4 percent by volume hydrocarbons, 4.1 percent by volume carbon monoxide, 6.6 percent by volume carbon dioxide and 0.6 percent by volume nitrogen. The apparatus described was in operation 238 days without shutdown for removal of balls of gummy material or other heavy deposits.

Obviously, many modifications and variations of the invention, as hereinabove set forth, can be made without departing from the spirit and scope thereof, and therefore only such limitations should be imposed as are indicated in the appended claims.

I claim:
1. Apparatus for recovering acid values from sulfuric acid sludge which comprises a sludge decomposer provided with an upper floor and a lower floor and communicating means therebetween adjacent the center thereof, means for introducing hot coked materials onto said upper floor adjacent one side thereof, rotating means for spreading said hot coked material on said upper floor to form a thin layer thereof and to move said hot coked material towards and through said communicating means onto said lower floor, fixed spray means mounted adjacent said coke entry means, having its spray pattern in the initial path of movement of said hot coked material across said upper floor, for spraying sulfuric acid sludge onto said layer, said spray means being adapted to produce a spray pattern having about a 90° cone, means for removing gaseous decomposition products from said decomposer, means for removing coked material from said lower floor, and means for recycling a portion of said coked material to said upper floor.

2. Apparatus for recovering acid values from sulfuric acid sludge which comprises a sludge decomposer provided with an upper floor and a lower floor and communicating means therebetween adjacent the center thereof, means for introducing hot coked materials onto said upper floor adjacent one side thereof, rotating means for spreading said hot coked material on said upper floor to form a thin layer thereof and to move said hot coked material towards and through said communicating means onto said lower floor, fixed spray means mounted adjacent said coke entry means, having its spray pattern in the initial path of movement of said hot coked material across said upper floor, for spraying sulfuric acid sludge onto said layer, said spray means being adapted to produce a spray pattern having about a 90° cone, with one of the edges of said cone being substantially perpendicular to said layer, whereby said spray produces no appreciable deposition of sulfuric acid sludge on said spreading means and on the inner walls of said decomposer, means for removing gaseous decomposition products from said decomposer, means for removing coked material from said lower floor, and means for recycling a portion of said coked material to said upper floor.

References Cited in the file of this patent
UNITED STATES PATENTS

| | | |
|---|---|---|
| 2,070,235 | Mullen | Feb. 9, 1937 |
| 2,074,061 | Mullen | Mar. 16, 1937 |
| 2,086,733 | Mullen | July 13, 1937 |
| 2,223,934 | Barnes et al. | Dec. 3, 1940 |
| 2,395,503 | Ross et al. | Feb. 26, 1946 |
| 2,541,695 | Gangewere | Feb. 13, 1951 |
| 2,703,749 | Herndon | Mar. 8, 1955 |
| 2,717,825 | Greenwalt | Sept. 13, 1955 |
| 2,777,756 | Anazawa | Jan. 15, 1957 |
| 2,894,819 | Catanach | July 14, 1959 |